Patented Dec. 13, 1938

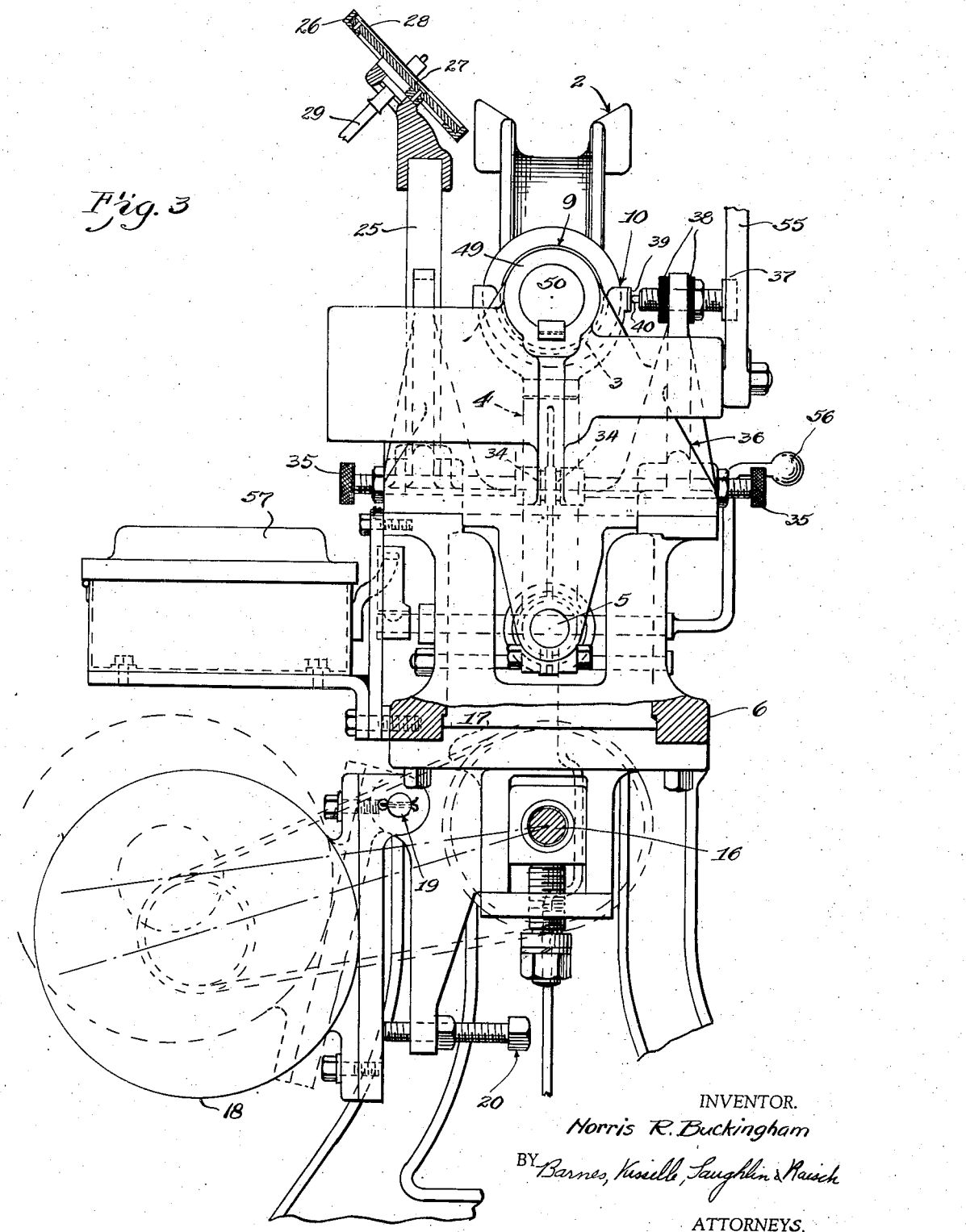

2,140,398

UNITED STATES PATENT OFFICE 2,140,398

BALANCING AND CENTER LOCATING MACHINE

Norris R. Buckingham, Lansing, Mich., assignor to Atlas Drop Forge Company, Lansing, Mich., a corporation of Michigan Application October 25, 1935, Serial No. 46,775

7 Claims. (Cl. 73—51)

This invention relates to a balancing and center locating machine, and has to do particularly with a novel apparatus for bringing rough crank-shafts and the like into dynamic balance and for properly locating the centers when in dynamic balance.

Heretofore in the fabrication of crank-shafts and similar apparatus, it has been the practice to dynamically test such rotating bodies by various types of balancing machines after the normal finishing operations. Most of these balancing machines have utilized a vibratory pendulum, and most improvements during the last few years have been upon apparatus sensitive to slight unbalanced masses and on devices capable of making accurate and quick corrections. Heretofore, in utilizing these various types of balancing machines, it has usually been customary to obtain dynamic balance by the addition of counter-weights or by the removal of material at points variously indicated by different types of machines.

In accordance with the present invention, instead of first locating the axis of the rough crank-shaft geometrically and then testing the same for dynamic balance after finishing, I first establish the axis of balance of the rotating rough crank-shaft and then drill the centers at each end while the crank-shaft is in running dynamic balance; the direct result of this method is to materially reduce and in most cases eliminate the very costly operation of removing material after the finishing operation and the unsightly and weakening result in so doing.

More specifically, the present invention contemplates an extremely simple and compact machine which makes possible a very inexpensive method of establishing the axis of balance of a rough crank-shaft or similar unit. Such machine embodies a balanced cradle of longer length than the member to be balanced, the two ends of the cradle being supported by oscillatory inverted pendulum members and the crank-shaft being adjustably supported by means of chucks within the cradle. Other novel features include the combination of novel indicating means for accurately indicating the points of unbalance and so arranged that the ends of the crank-shaft or other member can be alternately brought towards true dynamic balance until the entire axis of balance of the complete unit is accurately established; while the oscillating movement of the pendulums is restricted, the balance cradle is floatingly supported by said pendulums within such restrictive movement, with the result that it is only necessary to alternately adjust the crank-shaft at each end within the cradle as checks are made adjacent each end of the rotating cradle.

Further features include center drilling means so constructed relative to the cradle as to permit drilling of the centers when and while the crank-shaft is in running dynamic balance, and various details of construction and arrangement as will be more clearly set forth in the specification and claims.

In the drawings:—

Fig. 3 is an end view of the unit shown in Figs. 1 and 2, some of the parts being in section and the balancing disc being removed.

The main important structure of the illustrated embodiment, or for that matter any balancing and centering machine in accordance with the present invention, comprises a cradle 2 supported in independently mounted bearings 3, said bearings forming a part of inverted pendulum members 4 which are mounted for restricted oscillation about pivots 5. The base and power control units for the pendulums and the cradle may be more or less standard, except insofar as it operates in combination with the balancing and centering.

Figure 2:
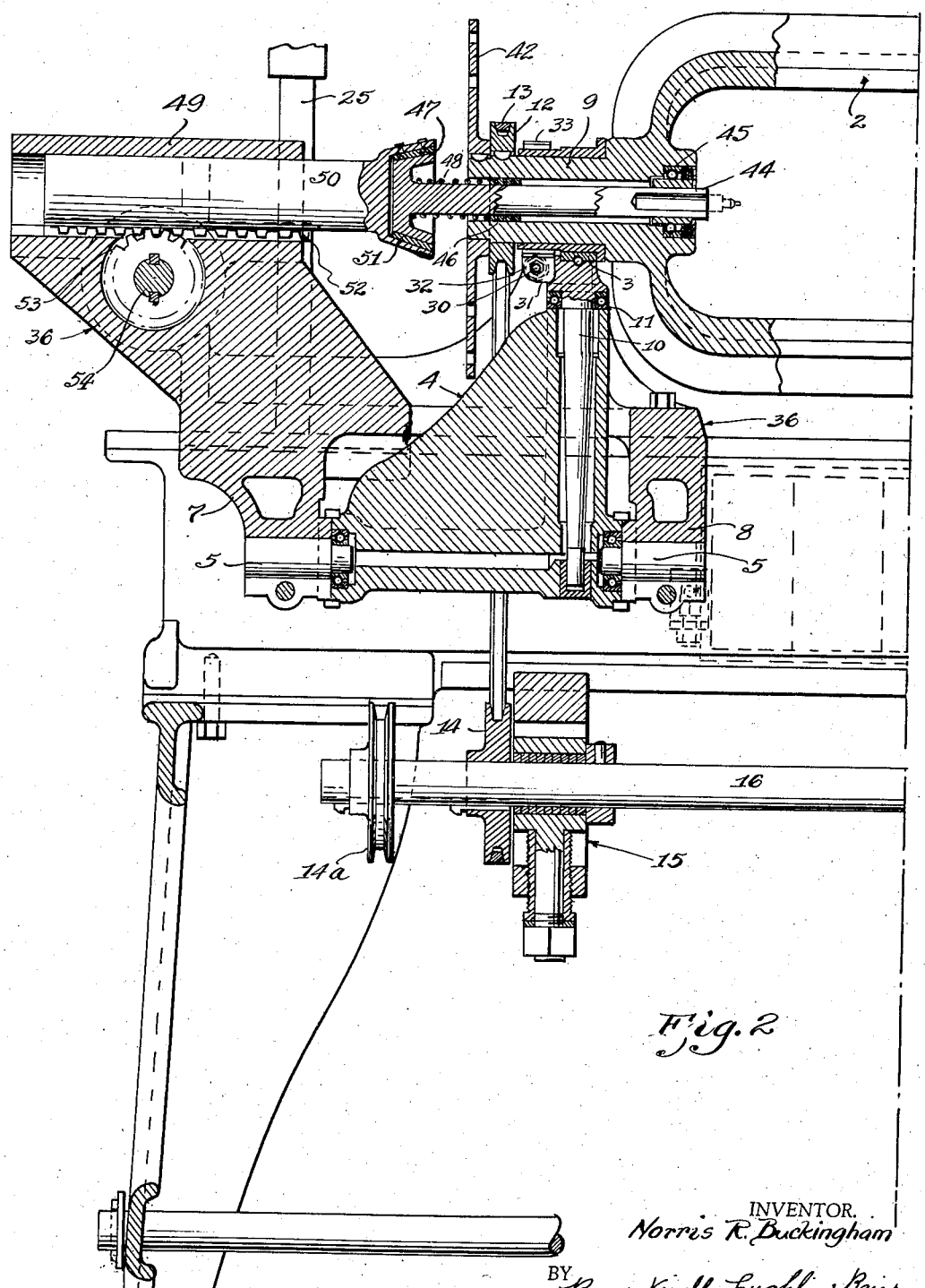
Fig. 2 is an enlarged fragmentary end view of the machine shown in Fig. 1, both ends of the machine being in duplicate.

Both ends of the balancing and center locating means are identical in construction and operation and the description of one end will be sufficient as far as details of description are concerned. The balancing machine base may be generally designated 6 and is so fabricated as to provide bearing supports 7 and 8 for the pivots 5 of the inverted pendulums; the actual mounting of the inverted pendulum being by means of roller bearings upon studs carried by the pivots 5, as best shown in section at the left hand end of Fig. 2. The bearings 3 at each end of the machine which support the trunnions 9 of the cradle 2 are directly carried by spindles 10, these spindles in turn being carried by roller bearings 11 mounted at the top of the inverted pendulum members 4 to permit of oscillation of the bearings 3 about the vertical axis of the spindle 10; this combined rotary and oscillating action of the bearings 3 is particularly important in obtaining alternate balancing of opposite ends of the crank-shaft.

The cradle 2 is rotated through sheaves 12 keyed to the trunnions 9 and in turn driven by belts 13. The belts 13 are driven at required balancing speeds from sheaves 14, keyed on shaft 16 and carried in three bearings 15, which bearings are mounted on the lower side of the base 6 and are vertically adjustable to obtain the proper belt tension and to compensate for belt stretch. The sheaves 14 are slidably keyed on the shaft 16 so that they can be positioned at different points along the shaft to accommodate different lengths of cradles, other positions of said sheaves being shown at 14a.

Figure 1:
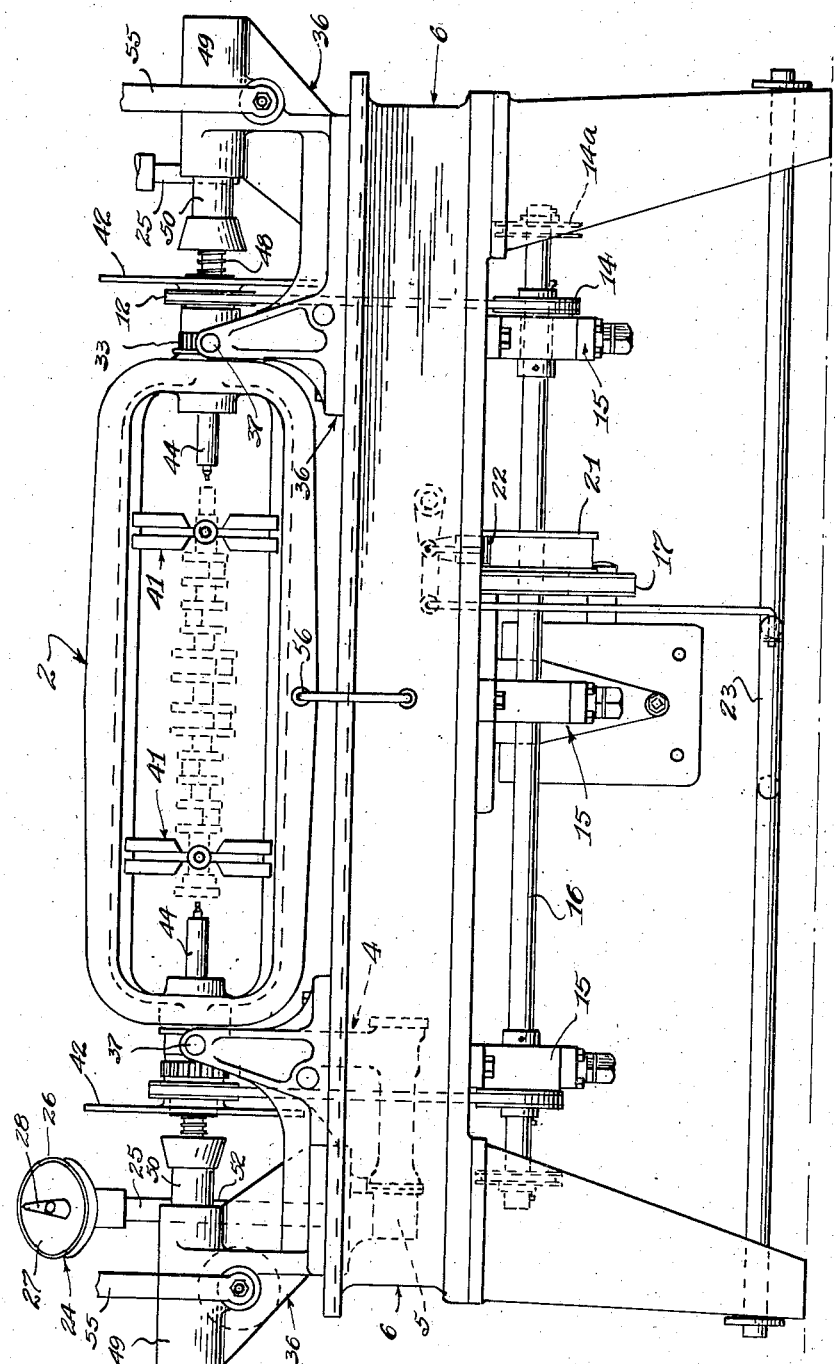
Fig. 1 is an elevation of the preferred embodiment of my crank-shaft balancing and center locating machine and showing a rough crank-shaft in position within the cradle.

The shaft 16 may be driven by a belt 17 leading from a suitable electric motor indicated as at 18, such motor being preferably hinge mounted on a pin 19; the tension of the belt 17 being adjusted by means of the screw 20 as indicated in Fig. 3. To accelerate balancing of the crankshaft, a brake drum 21 and brake shoe 22 is provided for the shaft 16, such brake shoe being connected by suitable linkage, as best shown in Fig. 1, to a foot pedal 23, whereby the cradle may be stopped quickly each time adjustment is required.

Means for indicating and locating the unbalance of the shaft are mounted at each end of the machine, and in the drawings I have shown only one such means generally indicated as at 24. It will be understood that such an indicating means will be located at each end of the machine in association with independently operable pendulums 4 whereby the amount of unbalance at each end of the cradle, and of course of the pendulums, is indicated independently. Each indicating means is mounted on a support 25 and consists of an outer graduated ring 26 insulated from the rest of the support and from the machine by means of the central disc 27. An indicator hand 28 is designed to rotate one revolution with every revolution of the cradle and this is accomplished by connecting the indicating means through the medium of a suitable flexible shaft, extending through a conduit 29, with a shaft 30, said shaft being carried by bracket 31 and being connected to a pinion 32 which in turn meshes with a worm 33 mounted on the trunnion 9 of the cradle; the ratio of the worm and pinion being one to one.

Oscillatory movement of the bearings 3 carrying the respective ends of the cradle is restricted by blocks of resilient material 34 mounted on the ends of stationary locked adjustable screws 35. The heads 36 at each end of the machine which carry practically all of the apparatus heretofore mentioned also carry adjustable spark contact screws 37, such screws being insulated from the machine by the insulating rings 38. The preferred method for indicating unbalance is by means of a spark. This is obtained by supplying current to the contact disc 39, such disc being carried by the pendulum 4 and so positioned as to contact with a spring pin 40 in the end of the adjustable screw 37 once each oscillation of the cradle and pendulum. The wiring diagram is not illustrated but it will be understood that a hook up such as shown by the patent to Lundgren, No. 1,860,257, may be used and that contact between the disc 39 and disc 40 will complete an electrical circuit through a suitable spark coil, the hot wire from the spark coil being connected to the ring 26, whereby upon completion of the circuit, sparks will jump from the edge of the ring 26 to the indicator hand 28 and then to ground through the machine. Inasmuch as the indicator hand 28 rotates in unison with the cradle 2, it will be seen that oscillation of one end of the cradle about the pivot 5 will cause contact between the disc 39 and pin 40 causing the spark to pass between the ring 26 and the indicator member to indicate the point of unbalance or, in other words, that point at which the cradle completes its oscillation. Stopping of the machine and movement of the cradle to that point where the indicator hand coincides with where the spark gap took place will obviously show the operator the exact point and exact direction at which the end of the crank shaft is to be adjusted.

The cradle 2 carries independent chucks 41 which are adjustable longitudinally of the cradle to accommodate crank shafts and similar articles of varying length and dimensions; in other words, crank shafts of substantially the same length but having a different arrangement of throws and bearings may be clamped at the proper place by adjusting one or both of the chucks 41 longitudinally. The particular design and details of the chucks need not be gone into except to state that the chucks do have a member pivoted or otherwise movable to permit insertion of the crank shaft within the cradle. In other words, in balancing and centering a crank shaft, all that is necessary is to open the swingable or otherwise movable part of each chuck, laterally swing the crank shaft into position within the cradle and then assemble the chuck and tighten the jaws of the same until the crank shaft is firmly held in position within the cradle. Almost any standard type of chuck may be utilized here and adjustment of the chucks to move the respective ends of the crank shaft to compensate for the unbalance may be made in the regular manner, as will be understood by those skilled in the art.

The head members 36 at each end of the base 6 are mounted for longitudinal adjustment whereby to accommodate different lengths of cradles. Each end of each cradle will, in addition to the worm 33 and sheave wheel 12, also carry a balancing weight disc 42, said disc containing a large number of apertures 43 for receiving graduated weights such as might be necessary to put the cradle assembly in balance or place a given amount of unbalance in the cradle assembly to compensate for off center means such as vibration dampeners and the like, which might later form a part of the finished crank shaft. It will be obvious that with the balancing disc 42 it will be possible to accurately dynamically balance each end of the cradle each time a new cradle is inserted in the machine. Adjustment of the heads 36 and sheave 14 obviously might throw the new cradle slightly out of balance, but this can be accurately taken care of by the balancing disc 42. The end of each cradle also carries a drill spindle 44, bearings 45 and 46, a cone clutch 47, and a helical return spring 48.

Each head 36 has a portion thereof in the form of a bearing 49 adapted to carry a longitudinally adjustable clutch sleeve 50, the end of the clutch sleeve being cupped to cooperate with the cone 47 and being provided with a clutch lining 51. Each clutch sleeve 50 carries a rack member 52 at the bottom thereof which meshes with a pinion 53 connected to a shaft 54, said shaft and said sleeve being operated through the medium of a lever 55. It will be understood that the sleeve 50 is in axial alignment with the cradle bearing 3 when the cradle is at rest and when the cradle is in running dynamic balance. Starting and directional rotation of the cradle is controlled by means of a lever 56, this lever being connected to a starting switch 57 whereby movement of the lever 56 will control the movement of the cradle in either direction.

In operation, the particular cradle 2 having been selected to accommodate given lengths of crank shafts, this cradle is mounted in position on the bearings 3, and the heads 36 and sheave wheels 14 having been adjusted, the cradle is rotated to be sure the same is in accurate dynamic balance, any unbalance being taken care of by adjustment of weights on one or both of the discs 42. This having been accomplished, if the particular crank shaft being balanced is designed to later on have a definite unbalance because of added fixtures or the like, such unbalance is proportionately compensated for by adding weights to the disc 42. The hinged members of the independent jaw chucks 41 are then opened and a rough crank shaft is moved into position within the chucks and is then chucked into place on the front and rear bearings. The cradle 2 is then set in motion in either direction by means of the lever 56. Next the contact screw 37 at one end of the machine is adjusted to make a slight contact with the disc 39 of the oscillating bearing 3 so that a spark is produced on the indicator ring 26 and notation is made by the operator as to just where this spark occurs on such indicator ring; the contact screw with the other end of the machine is next adjusted and notation made by the operator where the spark of unbalance occurs at the other end of the cradle. The rotation of the cradle is then stopped by moving the lever 56 to neutral and braking the revolving parts, and the cradle then turned manually, if necessary, until the indicator hand 28 is in that position at which spark occurred for each individual end; in other words, the cradle is moved until the indicator hand at one end is in the correct position at which point the chuck for that end of the cradle is adjusted (the shaft preferably being moved approximately straight back from the front of the machine), and then the cradle being further moved, if necessary, so that the indicator hand at the other end of the machine corresponds with the point of unbalance indicated by the spark gap and similar adjustment made. The amount of adjustment necessary at each end of the shaft will come very rapidly with experience and familiarity with the operation of the machine and oscillation tension of the respective cradle bearings.

The important point in the operation of the machine is that the crank shaft or other rough article placed in the cradle 2 must be properly centered within the cradle so that the cradle is in the same condition of running dynamic balance as was the case before the crank shaft was positioned within the cradle. In practice, the machine is started and oscillations and locations alternately checked at each end of the cradle until the whole crank and cradle are adjusted to a point that the indicating means 24 at each end thereof show that a satisfactory balance has been obtained at each end of the machine. When this point has been reached the cradle continues its rotation in running dynamic balance and the levers 55 at each end of the machine are then actuated so that the cup members 51 engage the drill clutch whereby to force center drills or other indicating means into the ends of the shaft.

It will thus be seen that the centers in each end of the shaft are located on the exact axis of balance of revolving parts and the crank shaft is then ready for machining operations which machining operations are produced while the crank is rotating on its correct axis of dynamic balance. The costly operation of removing or adding material is substantially eliminated or at least greatly reduced. After machining, the crank may be inserted in any type of finish balancing machine for a final check and to compensate for any small amount of unbalance that might have been produced by the machining operations.

What I claim is:

1. A crank-shaft balancing and center locating machine, comprising in combination a crank-shaft receiving member rotatably mounted within spaced apart oscillatably mounted bearing members having axes of oscillation spaced from the axis of said receiving member, and means carried by said member for receiving and adjustably positioning each end of a crank-shaft.

2. A crank-shaft balancing and center locating machine, comprising in combination a crank-shaft receiving member rotatably mounted within spaced apart oscillatably mounted bearing members having axes of oscillation spaced from the axis of said receiving member, and means carried by said member for receiving and adjustably positioning each end of a crank shaft, said member being so positioned and proportioned as to rotate within the bearing members without oscillation thereof.

3. A crank-shaft balancing and center locating machine, comprising in combination a crank-shaft receiving member rotatably mounted within spaced apart oscillatably mounted bearing members having axes of oscillation spaced from the axis of said receiving member, means carried by said member for receiving and adjustably positioning each end of a crank-shaft, and center locating means positioned to indicate the axis of balance on each end of the shaft while said member and shaft are rotated in running balance.

4. A crank-shaft balancing and center locating machine, comprising in combination a crank-shaft receiving member rotatably mounted within spaced apart bearing members, each member being oscillatable about a fixed horizontal axis spaced from the axis of said receiving member and about a vertical axis, and means carried by said member for receiving and adjustably positioning each end of a crank shaft.

5. In a machine for balancing and centering rough crank-shafts and the like, the combination of a base, longitudinally adjustable head members carried in each end of the base, a rotatably mounted crank receiving member, oscillatably mounted members carried by each head for freely supporting said crank receiving member and having axes of oscillation spaced from the axis of said receiving member, means for rotating said member while freely supported at both ends whereby any unbalance of said rotating member results in vibration of one or both of said oscillatably mounted members, said crank receiving member being normally balanced, and means for receiving and adjustably positioning the crank within said crank receiving member.

6. In a machine for balancing and centering rough crank-shafts and the like, the combination of longitudinally adjustable head members, a rotatably mounted crank receiving member, vibratory members pivotally mounted on and carried by each head for freely supporting said crank receiving member and having pivotal axes spaced from the axis of said receiving member, means for rotating said member while freely supported at both ends whereby any unbalance of said rotating member results in vibration of one or both of said vibratory members, said crank receiving member being normally balanced, and means for receiving and adjustably positioning the crank within said crank receiving member.

7. In a machine for balancing and centering rough crank-shafts and the like, the combination of longitudinally adjustable head members, a rotatably mounted crank receiving member, vibratory members pivotally mounted on and carried by each head for freely supporting said crank receiving member and having movement about a fixed horizontal axis, spaced from the axis of said receiving member, and about a vertical axis, means for rotating said member while freely supported at both ends whereby any unbalance of said rotating member results in vibration of one or both of said vibratory members, said crank receiving member being normally balanced, means for receiving and adjustably positioning the crank within said crank receiving member, and indicating means for locating the point of unbalance.

NORRIS R. BUCKINGHAM.